United States Patent
Hwang et al.

(10) Patent No.: US 10,893,510 B2
(45) Date of Patent: Jan. 12, 2021

(54) METHOD FOR TRANSMITTING HARQ ACK/NACK FROM USER EQUIPMENT SIMULTANEOUSLY ACCESSING MULTIPLE CELLS

(71) Applicant: LG Electronics Inc., Seoul (KR)

(72) Inventors: Daesung Hwang, Seoul (KR); Joonkui Ahn, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/741,392

(22) Filed: Jan. 13, 2020

(65) Prior Publication Data

US 2020/0154425 A1    May 14, 2020

Related U.S. Application Data

(63) Continuation of application No. 15/955,365, filed on Apr. 17, 2018, now Pat. No. 10,575,282, which is a
(Continued)

(51) Int. Cl.
*H04W 72/04* (2009.01)
*H04L 5/00* (2006.01)
(Continued)

(52) U.S. Cl.
CPC ....... *H04W 72/0406* (2013.01); *H04L 1/1671* (2013.01); *H04L 1/1822* (2013.01);
(Continued)

(58) Field of Classification Search
CPC .......... H04W 72/0406; H04W 72/0446; H04L 1/1671; H04L 1/1822; H04L 5/001; H04L 5/0055; H04L 5/14; H04L 5/1469
See application file for complete search history.

(56) References Cited

U.S. PATENT DOCUMENTS

| | | | |
|---|---|---|---|
| 2004/0264393 A1 | 12/2004 | Desgagne | H04W 72/04 370/294 |
| 2005/0141450 A1 | 6/2005 | Carlton | H04W 36/26 370/329 |

(Continued)

FOREIGN PATENT DOCUMENTS

| | | |
|---|---|---|
| WO | 2012108720 | 8/2012 |
| WO | 2012109195 | 8/2012 |

(Continued)

*Primary Examiner* — Jenee Holland
(74) *Attorney, Agent, or Firm* — Dentons US LLP

(57) ABSTRACT

One disclosure of the present specification provides a user equipment method. The method comprises the steps of: receiving a time division duplex (TDD) uplink (UL)-downlink (DL) configuration from a frequency division duplex (FDD)-based primary cell; receiving downlink data from at least one secondary cell; determining an uplink subframe of the primary cell to transmit a hybrid automatic repeat request (HARQ) acknowledgement (ACK)/negative-acknowledgement (NACK) for the received downlink data, which is transmitted from the at least one secondary cell, according to the TDD UL-DL configuration; and transmitting the HARQ ACK/NACK from the determined uplink subframe to the primary cell.

16 Claims, 16 Drawing Sheets

Related U.S. Application Data continuation of application No. 15/027,347, filed as application No. PCT/KR2014/007433 on Aug. 11, 2014, now Pat. No. 9,974,057.

(60) Provisional application No. 61/897,223, filed on Oct. 30, 2013.

(51) Int. Cl.
  *H04L 5/14* (2006.01)
  *H04L 1/16* (2006.01)
  *H04L 1/18* (2006.01)

(52) U.S. Cl.
  CPC ............ *H04L 1/1861* (2013.01); *H04L 5/001* (2013.01); *H04L 5/0055* (2013.01); *H04L 5/14* (2013.01); *H04L 5/1469* (2013.01); *H04W 72/0446* (2013.01)

(56) References Cited

U.S. PATENT DOCUMENTS

| | | | | |
|---|---|---|---|---|
| 2010/0284289 A1 | 11/2010 | Suo | | H04W 56/002 370/252 |
| 2011/0176461 A1* | 7/2011 | Astely | | H04B 7/2656 370/280 |
| 2011/0243039 A1 | 10/2011 | Papasakellariou | | H04L 1/1861 370/280 |
| 2012/0188907 A1 | 7/2012 | Dayal | | H04W 72/1215 370/254 |
| 2012/0230272 A1 | 9/2012 | Kim | | H04L 1/1861 370/329 |
| 2012/0300641 A1* | 11/2012 | Chen | | H04L 1/0026 370/241 |
| 2013/0034028 A1 | 2/2013 | Chen | | H04L 1/1854 370/280 |
| 2013/0051289 A1* | 2/2013 | Hsieh | | H04L 1/1845 370/280 |
| 2013/0077606 A1 | 3/2013 | Wu | | H04B 7/2656 370/336 |
| 2013/0083707 A1* | 4/2013 | Wang | | H04W 72/1289 370/280 |
| 2013/0083708 A1 | 4/2013 | Lin | | H04L 5/14 370/280 |
| 2013/0155915 A1 | 6/2013 | Park | | H04W 72/042 370/280 |
| 2013/0182583 A1* | 7/2013 | Siomina | | H04W 24/00 370/252 |
| 2013/0194931 A1 | 8/2013 | Lee | | H04L 5/0053 370/241 |
| 2013/0250772 A1 | 9/2013 | Yin | | H04L 5/16 370/241 |
| 2013/0315114 A1 | 11/2013 | Seo | | H04L 5/001 370/280 |
| 2013/0343239 A1 | 12/2013 | Damnjanovic | | H04L 5/001 370/280 |
| 2014/0003381 A1 | 1/2014 | Lee | | H04L 1/0026 370/329 |
| 2014/0022960 A1 | 1/2014 | Fu | | H04W 24/02 370/280 |
| 2014/0023004 A1 | 1/2014 | Kumar | | H04W 72/082 370/329 |
| 2014/0029484 A1 | 1/2014 | Choi | | H04J 3/1694 370/280 |
| 2014/0050188 A1 | 2/2014 | Park | | H04L 5/0053 370/329 |
| 2014/0119246 A1 | 5/2014 | Yin | | H04W 72/12 370/280 |
| 2014/0153449 A1 | 6/2014 | Seo | | H04L 1/1607 370/280 |
| 2014/0161002 A1 | 6/2014 | Gauvreau | | H04W 16/24 370/280 |
| 2014/0269452 A1* | 9/2014 | Papasakellariou | | H04L 5/0055 370/280 |
| 2014/0293843 A1 | 10/2014 | Papasakellariou | | H04W 72/042 370/280 |
| 2014/0293893 A1 | 10/2014 | Papasakellariou | | H04W 72/04 370/329 |
| 2014/0369242 A1 | 12/2014 | Ng | | H04W 72/0453 370/280 |
| 2015/0003302 A1 | 1/2015 | Ekpenyong | | H04W 72/14 370/280 |
| 2015/0085719 A1* | 3/2015 | Yin | | H04L 5/0055 370/280 |
| 2015/0092626 A1 | 4/2015 | Cheng | | H04L 5/14 370/280 |
| 2015/0263829 A1 | 9/2015 | Nguyen | | H04W 72/1289 370/280 |
| 2015/0282165 A1 | 10/2015 | Ni | | H04L 1/0026 370/329 |
| 2017/0079032 A1 | 3/2017 | Li | | H04W 74/0808 |

FOREIGN PATENT DOCUMENTS

| | | |
|---|---|---|
| WO | 2012124980 | 9/2012 |
| WO | 2012128558 | 9/2012 |
| WO | 2012174213 | 12/2012 |

\* cited by examiner

METHOD FOR TRANSMITTING HARQ ACK/NACK FROM USER EQUIPMENT SIMULTANEOUSLY ACCESSING MULTIPLE CELLS

This application is a continuation of U.S. application Ser. No. 15/955,365, filed on Apr. 17, 2018, which is a continuation of U.S. patent application Ser. No. 15/027,347, filed on Apr. 5, 2016, now issued as U.S. Pat. No. 9,974,057, which is a 371 national stage entry of International Application No. PCT/KR2014/007433, filed on Aug. 11, 2014, and claims the benefit of U.S. Provisional Application No. 61/897,223, filed on Oct. 30, 2013, all of which are hereby incorporated by reference in their entirety herein.

BACKGROUND OF THE INVENTION

Field of the invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, there are growing demands from users for a higher transmission rate in recent years. To satisfy users' demands, it is necessary to allow a UE to simultaneously access both a cell using FDD and a cell using TDD. When a mobile network operator provides FDD-based services or FDD-based services only as in traditionally in demand for a higher transmission rate, use of frequencies may be inefficient.

SUMMARY OF THE INVENTION

Accordingly, a disclosure of the specification has been made in an effort to solve the problem.

In order to achieve the aforementioned purpose, one disclosure of the present specification provides a method for transmitting a hybrid automatic repeat request (HARQ) acknowledgement (ACK)/non-acknowledgement (NACK). The method may be performed by a user equipment (UE) and comprise: receiving a time division duplex (TDD) uplink (UL)-downlink (DL) configuration from a frequency division duplex (FDD)-based primary cell; receiving downlink data from at least one secondary cell; determining an uplink subframe of the primary cell to transmit an HARQ ACK/NACK with respect to the downlink data received from the at least one secondary cell according to the TDD UL-DL configuration; and transmitting the HARQ ACK/NACK to the primary cell on the determined uplink subframe.

The TDD UL-DL configuration may be received through system information.

The system information may be a system information block (SIB).

The method may further comprise: receiving an offset for the TDD UL-DL configuration. Here, in the determination, the uplink subframe to transmit the HARQ ACK/NACK may be determined based on the TDD UL-DL configuration and the offset.

The offset may be UE-specific and thus varies depending on a UE. The uplink subframe to transmit the HARQ ACK/NACK may vary depending on a UE according to the offset.

In order to achieve the aforementioned purpose, one disclosure of the present specification provides a user equipment (UE). The UE may comprise: a transceiver to receive a time division duplex (TDD) uplink (UL)-downlink (DL) configuration from a frequency division duplex (FDD)-based primary cell and to receive downlink data from at least one secondary cell; and a processor to control the transceiver and to determine an uplink subframe of the primary cell to transmit a hybrid automatic repeat request (HARQ) acknowledgement (ACK)/non-acknowledgement (NACK) with respect to the downlink data received from the at least one secondary cell according to the TDD UL-DL configuration. The processor is further configured to transmit the HARQ ACK/NACK to the primary cell on the determined uplink subframe through the transceiver.

According to a disclosure of the present specification, the aforementioned problem of the conventional technology is solved. In particular, the number of user equipments (UEs) simultaneously accessing a macro cell is significantly increased, thereby improving efficiency of a heterogeneous network including the macro cell and a plurality of small cells.

DESCRIPTION OF EXEMPLARY EMBODIMENTS

Figure 1:
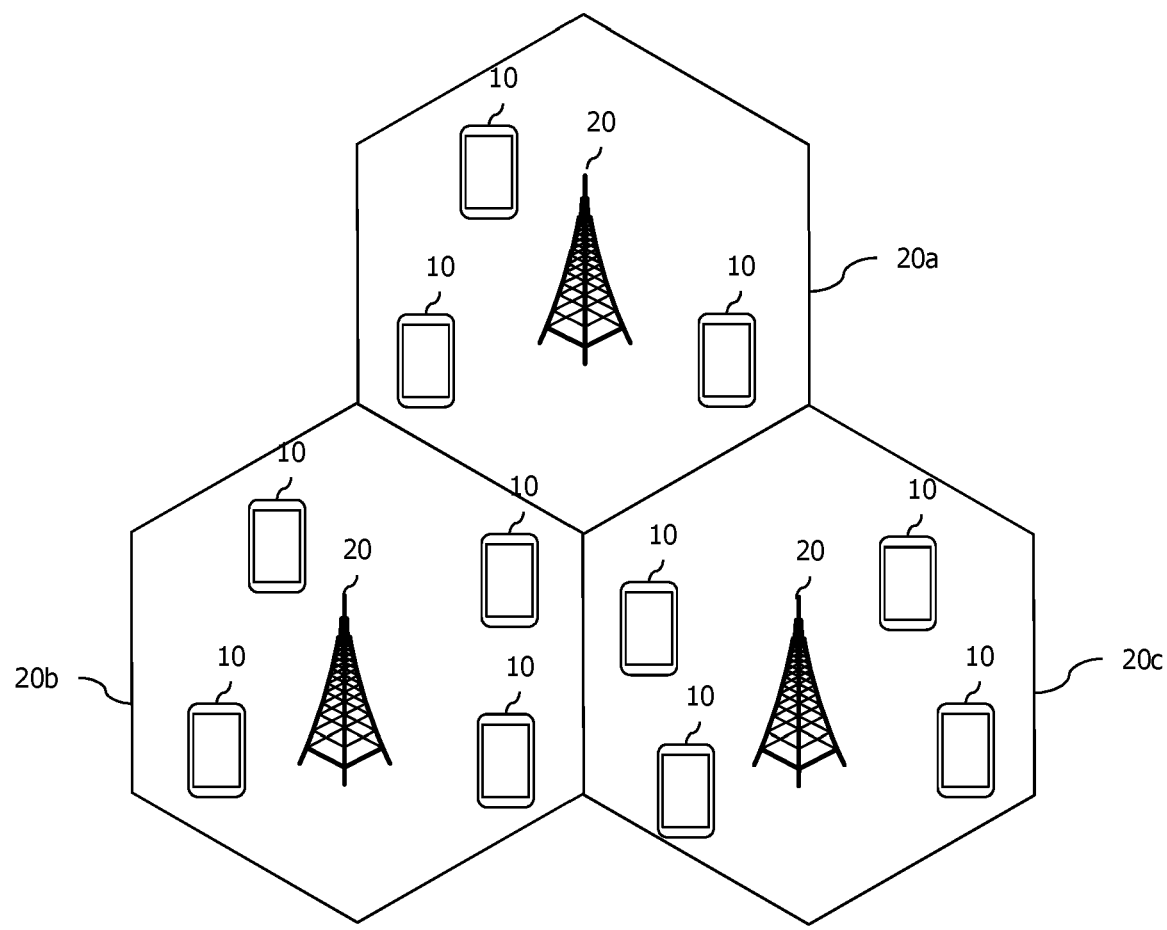
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components arc not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
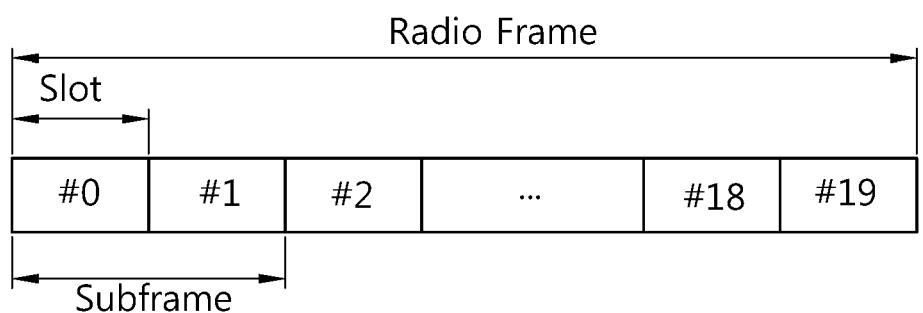
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10. 4. 0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
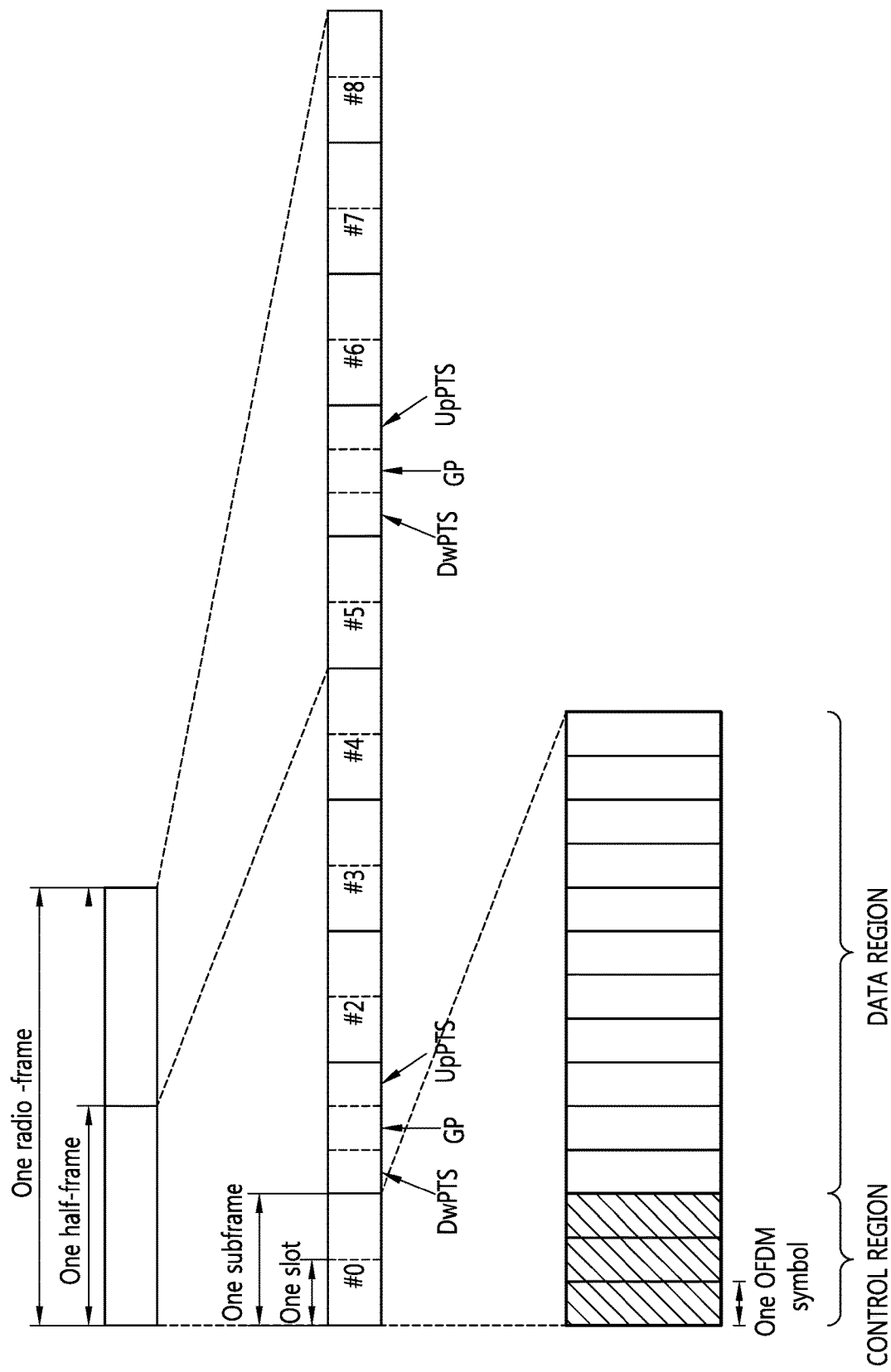
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example. OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UT, sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
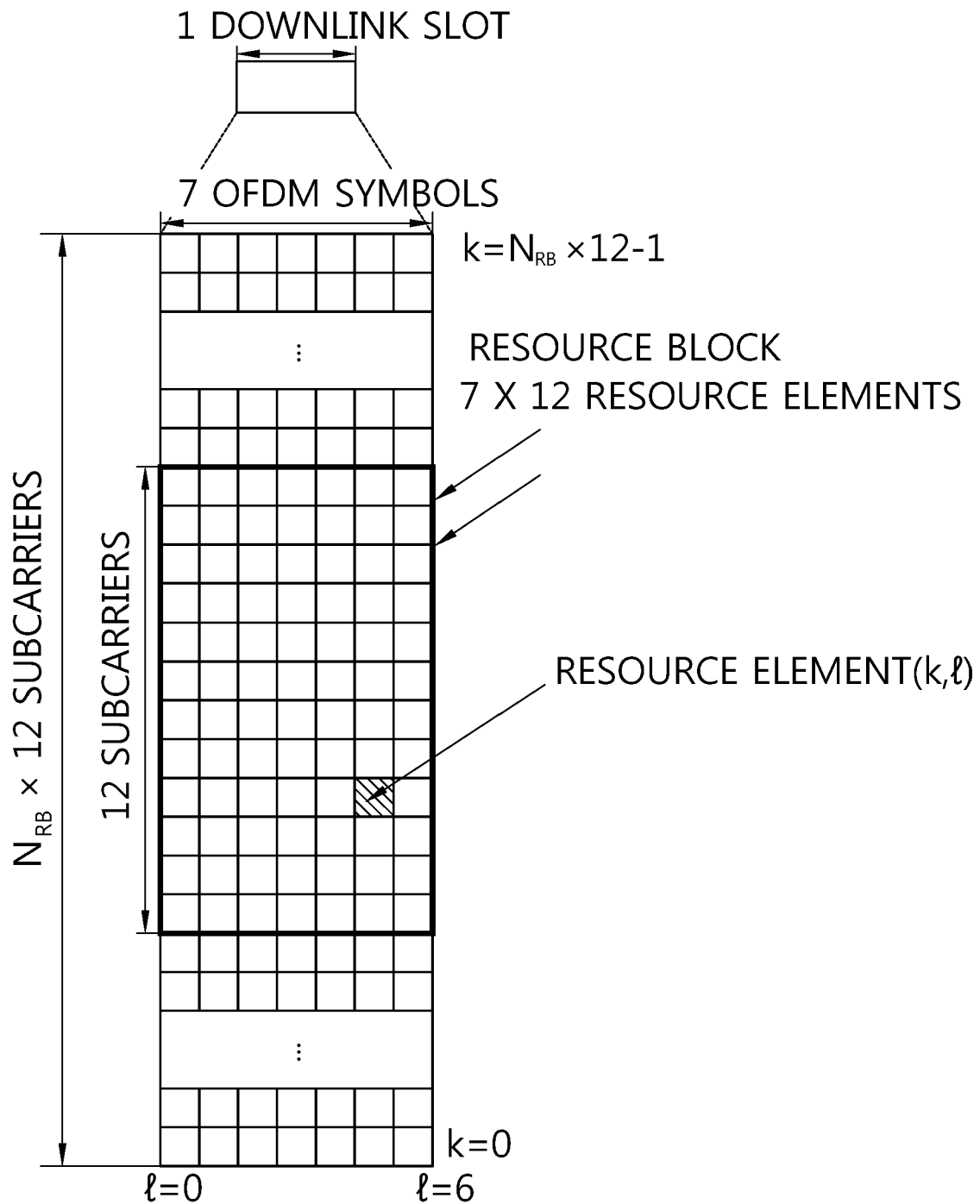
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
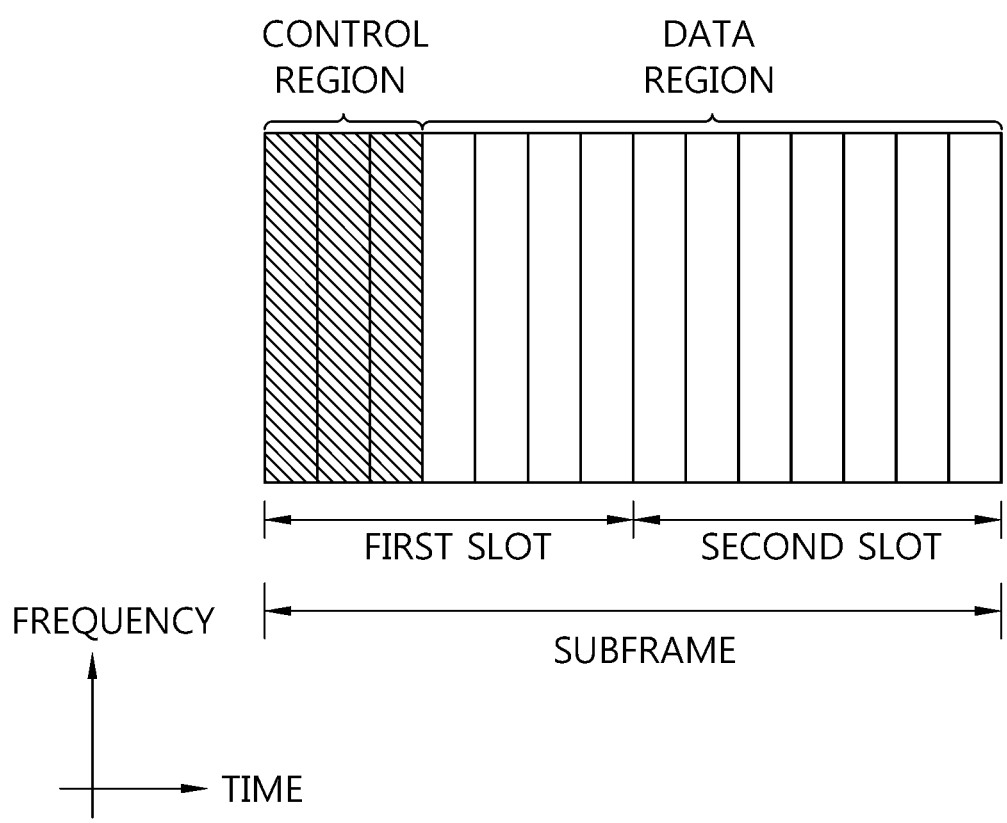
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier C-RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information Hock (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set { 1 , 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

The usage of the DCI format is classified as shown in Table 3 below.

TABLE 3

| DCI format | Contents |
| --- | --- |
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmission mode |

TABLE 2

| Transmission mode | DCI format | Search space | Transmission mode of PDSCH according to PDCCH |
| --- | --- | --- | --- |
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD (Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO (Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmission ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmission ports is 1, single antenna port, port 0. Otherwise, transmit diversity |
| | DCI format 2B | Terminal specific | Dual layer transmission (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmission layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmission layers, ports 7-14 are used or port 7 or 8 is used as independent antenna port |

The uplink channels include a PUSCH, a PUCCH, an SRS (Sounding Reference Signal), and a PRACH (physical random access channel).

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
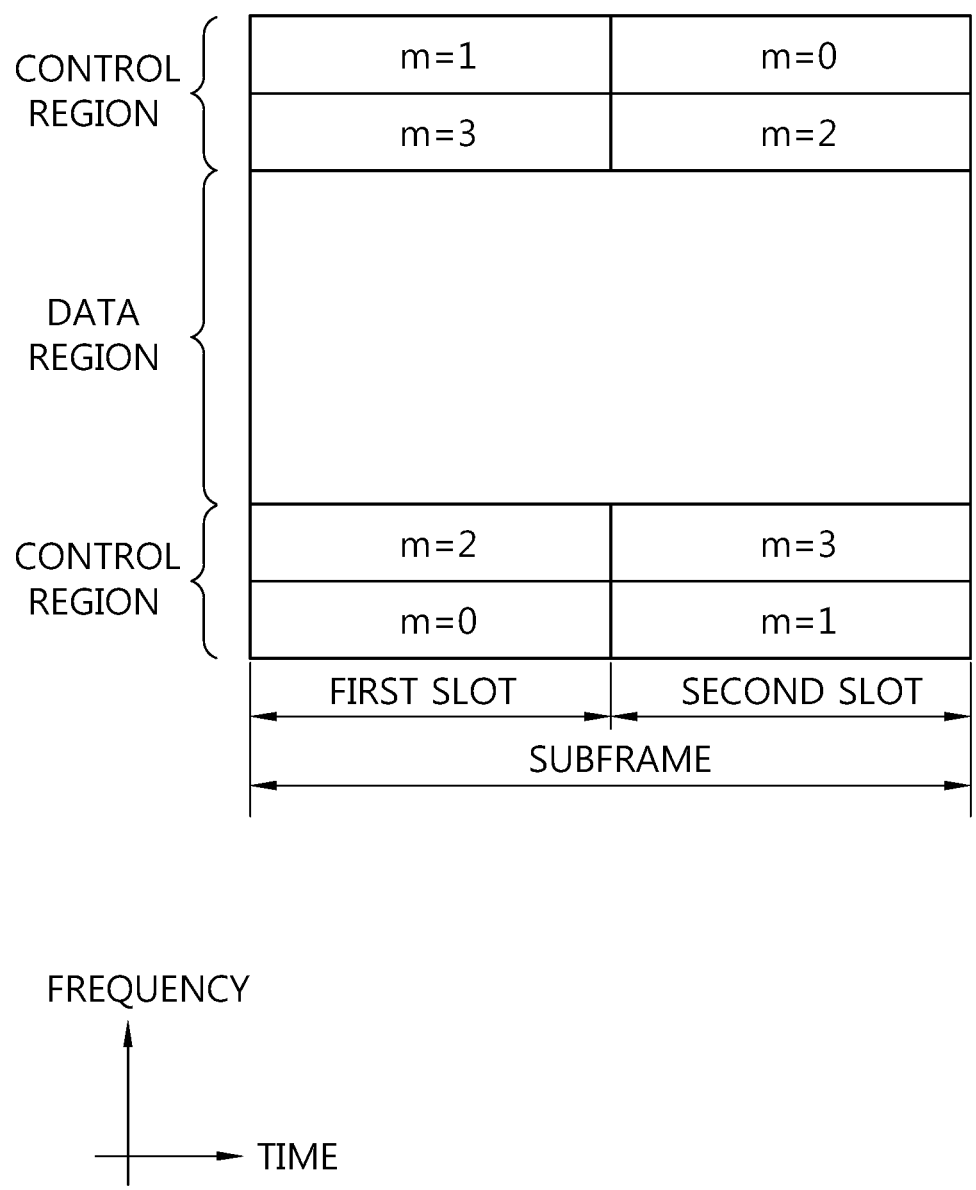
FIG. 6 illustrates the architecture of an uplink subframe in 3GPP LTE.

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

Figure 7:
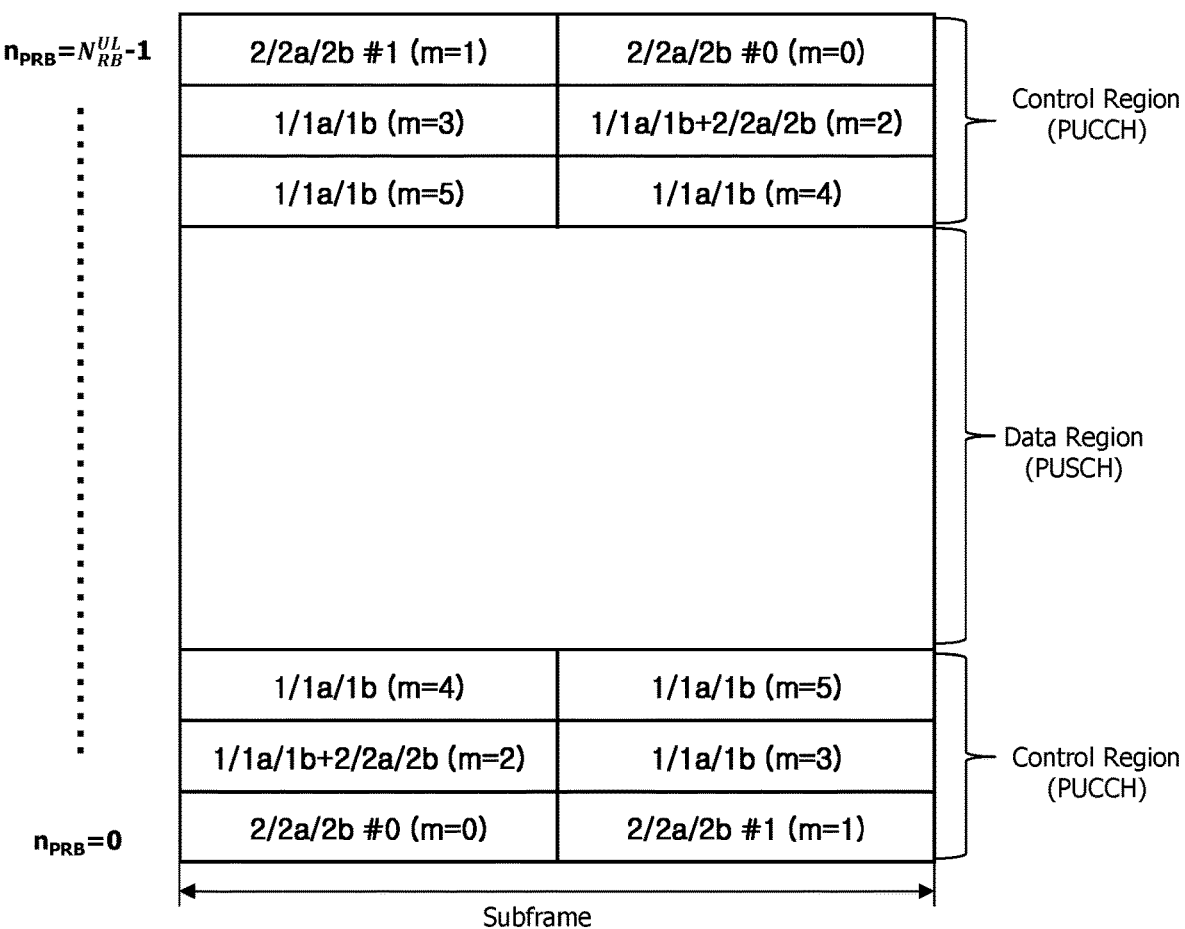
FIG. 7 illustrates a PUCCH and a PUSCH on an uplink subframe.

FIG. 7 illustrates a PUCCH and a PUSCH on an uplink subframe.

PUCCH formats will be described with reference to FIG. 7.

Uplink control information (UCI) may be transmitted to the PUCCH. In this case, the PUCCH transmits various types of control information according to a format. The UCI includes a HARQ ACK/NACK, a scheduling request (SR), and channel status information (CSI) representing a downlink channel status.

PUCCH format 1 transmits a scheduling request (SR). In this case, an on-off keying (OOK) scheme may be applied. PUCCH format 1 a transmits an acknowledgement/non-acknowledgment (ACK/NACK) modulated by a binary phase shift keying (BPSK) scheme with respect to one codeword. PUCCH format 1b transmits an ACK/NACK modulated by a quadrature phase shift keying (QPSK) scheme with respect to two codewords. PUCCH format 2 transmits a channel quality indicator (CQI) modulated by the QPSK scheme. PUCCH formats 2a and 2b transport the CQI and the ACK/NACK.

Table 4 illustrates the PUCCH formats.

TABLE 4

| Format | Description |
| --- | --- |
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM. 64-QAM, and the like) to be applied to the DL channel and a coding rate by using the CQI. The CQI may be generated by various methods. For example, the various methods include a method of quantizing and feed-hacking the channel status as it is, a method of calculating and feed-backing a signal to interference plus noise ratio (SINR), a method of notifying a status which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-hack CQT is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats. A PUCCH having different bit numbers for each subframe may be used according to a modulation scheme subordinate to the PUCCH format.

Meanwhile, the illustrated PUSCH is mapped in an uplink shared channel (UL-SCH) which is a transmission channel. Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel status information. For example, the channel status information (CSI) multiplexed in the data may include the CQI, the PMI, the RI, and the like. Alternatively, the uplink data may be constituted by only the uplink status information. Periodic or aperiodic channel status information may be transmitted through the PUSCH.

The PUSCH is allocated by the UL grant on the PDCCH. Although not illustrated, a fourth OFDM symbol of each slot of the normal CP is used in the transmission of a demodulation reference signal (DM RS) for the PUSCH.

A carrier aggregation system is now described.

Figure 8:
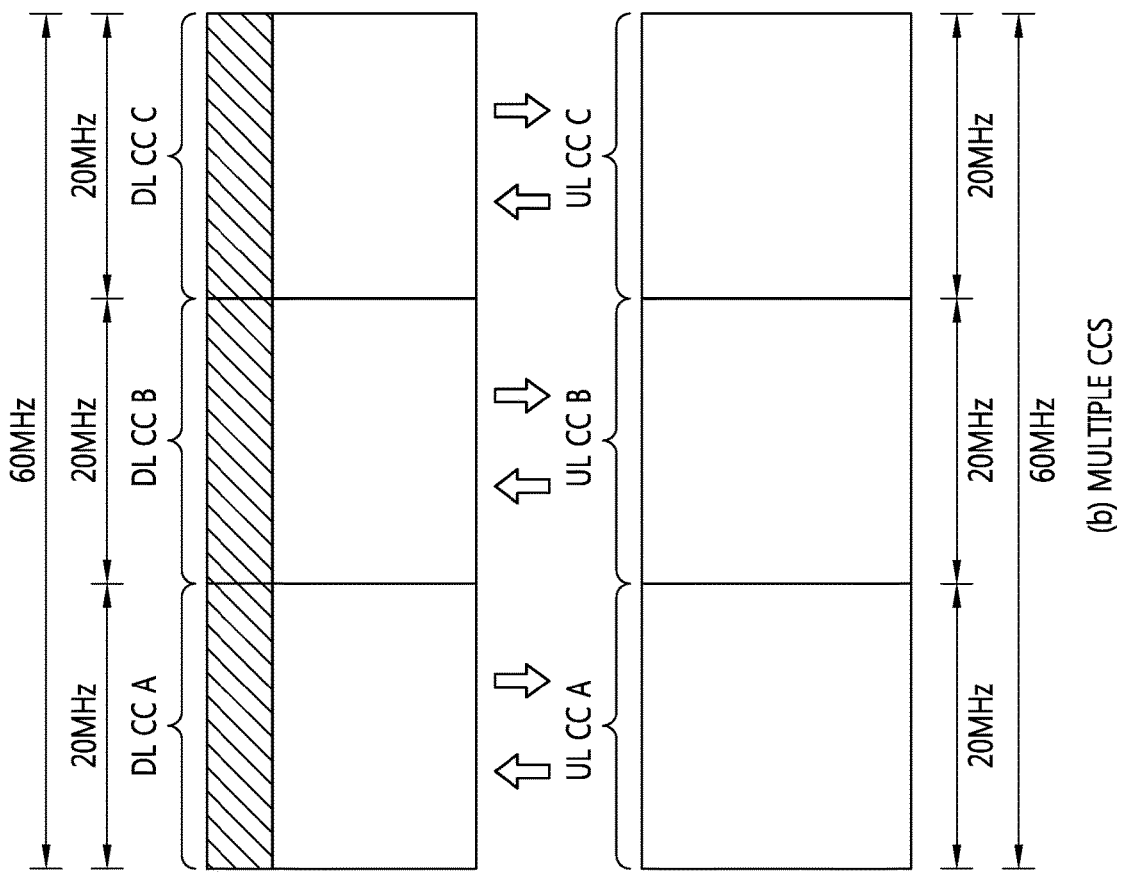
FIG. 8 illustrates an example of comparison between a single carrier system and a carrier aggregation system.
Figure 8:
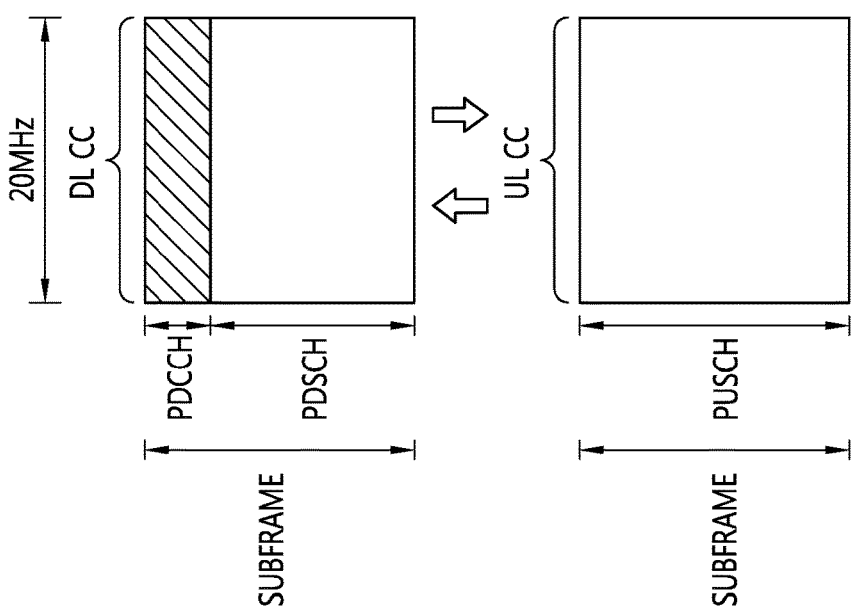

FIG. 8 illustrates an example of comparison between a single carrier system and a carrier aggregation system.

Referring to FIG. 8, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of [downlink component carrier, uplink component carrier]. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE- A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 9:
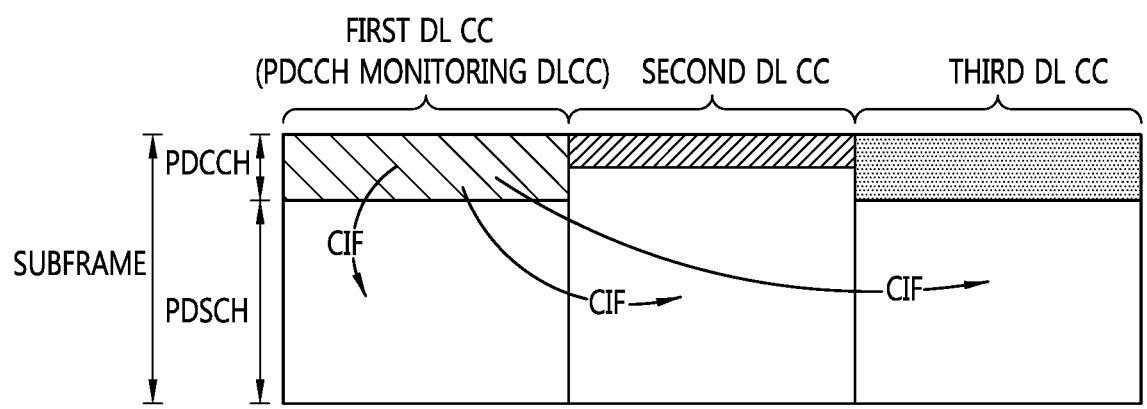
FIG. 9 exemplifies cross-carrier scheduling in a carrier aggregation system.

FIG. 9 exemplifies cross-carrier scheduling in the carrier aggregation system.

Referring to FIG. 9, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 9 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

<Transmission of Channel State Information (CSI)>

Hereinafter, periodic transmission and aperiodic transmission of the CSI will be described.

Figure 10A:
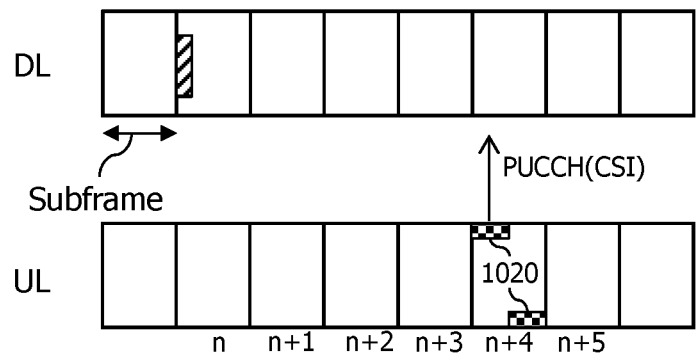
FIG. 10a illustrates an example of a periodic CSI report in 3GPP LTE.

FIG. 10a illustrates an example of a periodic CSI report in 3GPP LTE.

As shown in FIG. 10a, the CSI may be transmitted through the PUCCH periodically according to a period determined in the upper layer. That is, the periodic channel status information (CSI) may be transmitted through the PUCCH.

The UE may be semi-statically configured by an upper layer signal so as to periodically feed-back a differential CSI (CQI, PMI, RI) through the PUCCH. In this case, the UE transmits the corresponding CSI according to modes defined as shown in a table given below.

TABLE 5

| | | PMI feed-back time | |
|---|---|---|---|
| | | No PMI | Single PMI |
| PUCCH CQI feed-back type | Wideband CQI | Mode 1-0 | Mode 2-0 |
| | Selective subband CQI | Mode 2-0 | Mode 2-1 |

A periodic CSI reporting mode in the PUCCH described below is supported for each of the aforementioned transmission modes.

TABLE 6

| Transmission mode | PUCCH CSI reporting mode |
|---|---|
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | When PMI/RI reporting is configured to UE in modes 1-1 and 2-1; When PMI/RI reporting is not configured to UE in modes 1-0 and 2-0 |
| transmission mode 9 | When PMI/RI reporting is configured to UE in modes 1-1 and 2-1 and the number of CSI-RS ports is larger than 1. When PMI/RI reporting is not configured to UE in modes 1-0 and 2-0 or the number of CSI-RS ports is 1 |

Meanwhile, a collision of the CSI report means a case in which a subframe configured to transmit a first CSI and a subframe configured to transmit a second CSI are the same as each other. When the collision of the CSI report occurs, the first CSI and the second CSI are simultaneously transmitted, or the transmission of a CSI having a low priority is discarded (alternatively, referred to as abandon or drop), and a CSI having a high priority may be transmitted, according to priorities of the first CSI and the second CSI.

The CSI report through the PUCCH may include various report types according to a transmission combination of the CQI, the PMI, and the RI, and a period and an offset value divided according to each report type (hereinafter, abbreviated as a type) are supported.

Type 1: Supports CQI feedback for a subband selected by the UE.

Type 1a: Supports subband CQI and second PMI feedback.

Types 2, 2b, and 2c: Supports wideband CQI and PMI feedback.

Type 2a: Supports wideband PMI feedback.

Type 3: Supports RT feedback.

Type 4: Transmits the wideband CQI.

Type 5: Supports RI and wideband PMI feedback.

Type 6: Supports RI and PTI feedback.

Hereinafter, the aperiodic transmission of CSI is described.

Figure 10B:
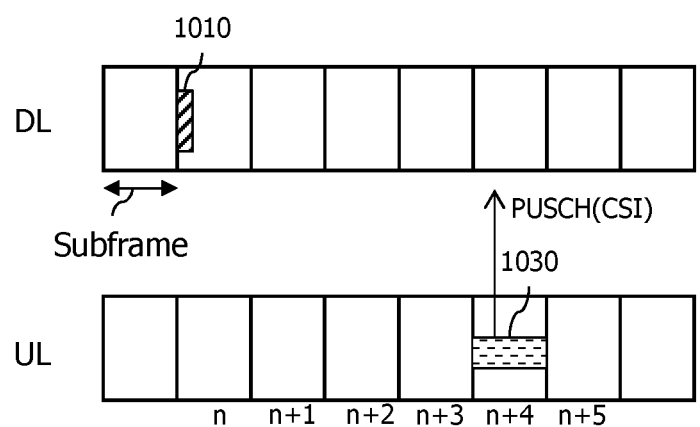
FIG. 10b illustrates an example of an aperiodic CSI report in 3GPP LTE.

FIG. 10b illustrates an example of an aperiodic CSI report in 3GPP LTE.

A control signal that requests the transmission of CSI, that is, an aperiodic CSI request signal, may be included in the scheduling control signal of a PUSCH transmitted in a PDCCH 1010, that is, an UL grant. In this case, UE aperiodically reports CSI through a PUSCH 1020. As described above, the transmission of CSI on a PUSCH is called an aperiodic CSI report in that it is triggered in response to a request from a BS. The CSI report may be triggered by an UL grant or a random access response grant.

More specifically, a wireless device receives an UL grant, including information about the scheduling of the PUSCH, through the PDCCH 1010 in a subframe n. The UL grant may include a CQI request field. The following table illustrates an example of a CQI request field of 2 bits. The value or number of bits of the CQI request field is only an example.

TABLE 7

| Value of CQI request field | Contents |
|---|---|
| 00 | A CSI report is not triggered |
| 01 | A CSI report on a serving cell is triggered |
| 10 | A CSI report on a first set of serving cells is triggered |
| 11 | A CSI report on a second set of serving cells is triggered |

A BS may previously notify a wireless device of information about the first and the second sets whose CSI reports are triggered.

A BS may previously notify a wireless device of information about the first and the second sets whose CSI reports are triggered.

When a CSI report is triggered, the wireless device sends CSI on the PUSCH 1020 in a subframe n+k. In this case, k=4, but is only an example.

A BS may previously designate report mode for CSI to a wireless device.

The following table illustrates an example of CSI report modes in 3GPP LTE.

TABLE 8

| | PMI feedback type | | |
|---|---|---|---|
| | No PMI | Single PMI | Multiple PMI |
| Wideband CQI | | | Mode 1-2 |
| Selective subband CQI | Mode 2-0 | | Mode 2-2 |
| Set subband CQI | Mode 3-0 | Mode 3-1 | |

(1) Mode 1-2 (mode 1-2)

A precoding matrix is selected on the assumption that DL data is transmitted only through a corresponding subband with respect to each subband. A wireless device generates a CQI (called a wideband CQI) by assuming the selected precoding matrix with respect to a band (called a band set S) designated by a system band or a high layer signal.

The wireless device sends CSI including the wideband CQI and the PMI of each subband. In this case, the size of each subband may be different depending on the size of a system band.

(2) Mode 2-0

A wireless device selects preferred M subbands with respect to a band (band set S) designated by a system band or a high layer signal. The wireless device generates a subband CQT by assuming that data has been transmitted in the selected M subbands. The wireless device additionally generates a single wideband CQI with respect to the system band or the band set S.

The wireless device sends CSI, including information about the selected M subbands, the subband CQI, and the wideband CQI.

(3) Mode 2-2

A wireless device selects M preferred subbands and a single precoding matrix for the M preferred subbands on the assumption that DL data is transmitted through the M preferred subbands.

Subband CSI for the M preferred subbands is defined in each codeword. In addition, the wireless device generates a wideband CQI for a system band or a band set S.

The wireless device sends CSI, including the M preferred subbands, a single subband CQI, and a PMI, wideband PMI, and wideband CQI for the M preferred subbands.

(4) Mode 3-0

A wireless device sends CSI, including a wideband CQI and a subband CQI for configured subbands.

(5) Mode 3-1

A wireless device generates a single precoding matrix for a system band or a band set S. The wireless device generates a subband CQI for each codeword by assuming the generated single precoding matrix. The wireless device may generate a wideband CQI by assuming the single precoding matrix.

The simultaneous transmission of a PUCCH and a PUSCH is described below.

In 3GPP Release 8 or Release 9 systems, UE is not allowed to simultaneously send a PUCCH and a PUSCH on a single carrier in order to maintain single carrier characteristics when using the SC-FDMA method for uplink transmission.

In 3GPP Release 10 systems, however, whether a PUCCH and a PUSCH are simultaneously transmitted may be indicated by a higher layer. That is, UE may simultaneously send a PUCCH and a PUSCH or may send only one of a PUCCH and a PUSCH in response to an instruction from a higher layer.

Figure 10C:
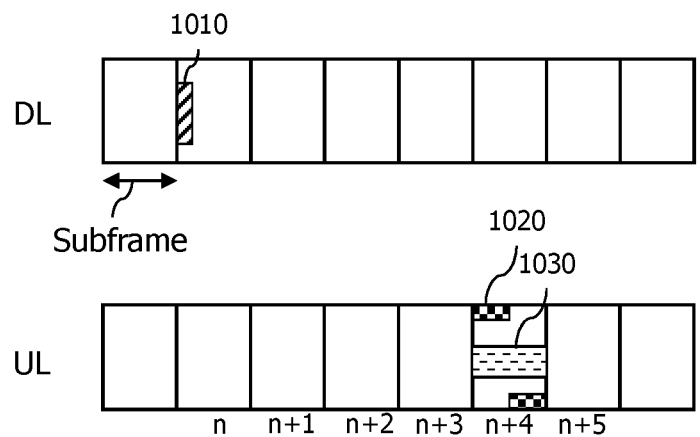
FIG. 10c illustrates an example of the simultaneous transmission of a PUCCH and a PUSCH.

FIG. 10c illustrates an example of the simultaneous transmission of a PUCCH and a PUSCH.

As may be seen with reference to FIG. 10c, UE receives a PDCCH 1010 in a subframe n.

Furthermore, the UE may simultaneously send a PUCCH 1020 and a PUSCH 1030 in a subframe n+4, for example.

The simultaneous transmission of the PUCCH and the PUSCH is defined as follows in a 3GPP Release 10 system.

It is assumed that UE has been configured for only a single serving cell and configured to not simultaneously send a PUSCH and a PUCCH. In this case, if the UE does not send a PUSCH, UCI may be transmitted according to the PUCCH formats 1/1a/1b/3. If the UE sends a PUSCH, but the PUSCH does not correspond to a random access response grant, UCI may be transmitted through the PUSCH.

Unlike in the above, it is assumed that UE has been configured for only a single serving cell and configured to not simultaneously send a PUSCH and a PUCCH. In this case, if UCI includes only HARQ-ACK and an SR, UCI may be transmitted through a PUCCH according to the PUCCH formats 1/1a/1b/3. If UCI includes only periodic CSI, however, the UCI may be transmitted on a PUCCH according to the PUCCH format 2. Alternatively, if UCI includes periodic CSI and HARQ-ACK and the UE does not send a PUSCH, the UCI may be transmitted through a PUCCH according to the PUCCH formats 2/2a/2b. Alternatively, if UCI includes only HARQ-ACK/NACK or UCI includes HARQ-ACK/NACK and an SR, UCI includes an affirmative SR and periodic/aperiodic CSI, or UCI includes only aperiodic CSI, the HARQ-ACK/NACK, the SR, and the affirmative SR may be transmitted through a PUCCH, and the periodic/aperiodic CSI may be transmitted through a PUSCH.

Unlike in the above, it is assumed that UE has been configured for one or more serving cells and configured to not simultaneously send a PUSCH and a PUCCH. In this case, if the UE does not send a PUSCH, UCI may be transmitted through a PUCCH according to the PUCCH formats 1/1a/1b/3. If UCI includes aperiodic CSI or includes aperiodic UCI and HARQ-ACK, the UCI may be transmitted through the PUSCH of a serving cell. Alternatively, if UCI includes periodic CSI and HARQ-ACK/NACK and the UE does not send a PUSCH in the subframe n of a primary cell, the UCI may be transmitted through the PUSCH.

Unlike in the above, it is assumed that UE has been configured for one or more serving cells and configured to be able to simultaneously send a PUSCH and a PUCCH. In this case, if UCI includes one or more of HARQ-ACK and an SR, the UCI may be transmitted through a PUCCH according to the PUCCH formats 1/1a/1b/3. If UCI includes only periodic CSI, however, the UCI may be transmitted through a PUCCH using the PUCCH format 2. Alternatively, if UCI includes periodic CSI and HARQ-ACK/NACK and the UE does not send a PUSCH, CSI may be dropped (or abandoned) without being transmitted according to some conditions. Alternatively, if UCI is transmitted through HARQ-ACK/NACK and periodic CSI and the UE sends a PUSCH in the subframe of a primary cell, the HARQ-ACK/NACK may be transmitted through a PUCCH according to the PUCCH formats 1a/1b/3 and the periodic CSI may be transmitted through the PUSCH.

<Introduction of Small Cell>

Meanwhile, in a next-generation mobile communication system, it is expected that a small cell of which a cell coverage radius is small is added in the coverage of a legacy cell and that the small cell handles a greater amount of traffic. The legacy cell has a greater coverage than that of the small cell, and thus is also referred to as a macro cell. Hereinafter, it is described with reference to FIG. 11.

Figure 11:
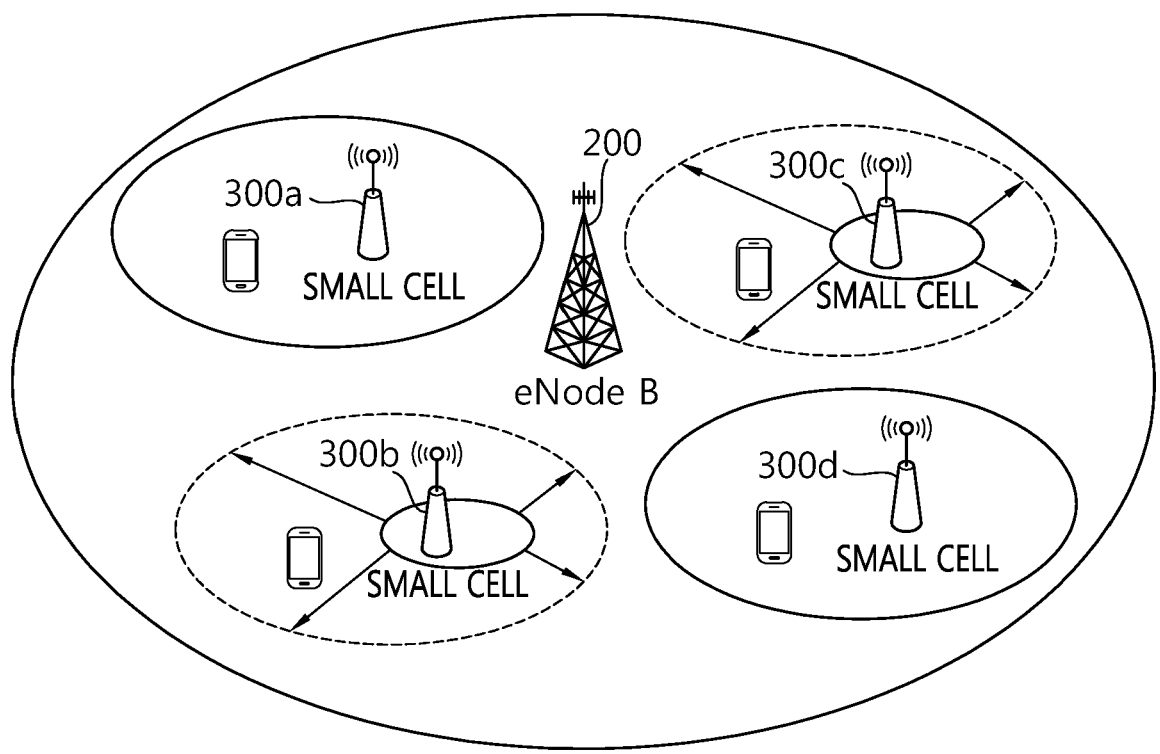
FIG. 11 shows a heterogeneous network environment in which a macro cell and a small cell co-exist and which is possibly used in a next-generation wireless communication system.

FIG. 11 shows a heterogeneous network environment in which a macro cell and a small cell co-exist and which is possibly used in a next-generation wireless communication system.

Referring to FIG. 11, it is shown a heterogeneous network environment in which a macro cell 200 overlaps with one or more small cells 300a, 300b, 300c, and 300d. A service of the macro cell 200 is provided by a macro eNodeB (MeNB). In the present specification, the macro cell and the MeNB may be used together. A UE having access to the macro cell 200 may be referred to as a macro UE. The macro UE receives a downlink signal from the MeNB, and transmits an uplink signal to the MeNB.

In such a heterogeneous network, coverage holes of the macro cell can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

Meanwhile, the small cell may use a frequency band currently assigned to LTE/LTE-A, or may use a higher frequency band (e.g., a band greater than or equal to 3.5 GHz).

On the other hand, in a next LTE-A system, it is considered that the small cell is used only as a macro-assisted small cell which cannot be used independently and can be used under an assistance of the macro cell.

The small cells 300a, 300b, 300c, and 300d may have similar channel environments, and are located close to each other. Therefore, interference between the small cells is not a big problem.

The small cells 300b and 300c may extend or reduce their coverage to decrease an interference influence. Such coverage extension and reduction are called cell breathing. For example, as illustrated, the small cells 300b and 300c may be on or off according to a situation.

On the other hand, the small cell may use a frequency band currently assigned to LTE/LTE-A, or may use a higher frequency hand (e.g., a hand greater than or equal to 3.5 GHz).

Meanwhile, the UE may perform dual connectivity to the macro cell and the small cell. Possible dual connectivity scenarios are shown in FIG. 11a to FIG. 11d.

Figure 12A:
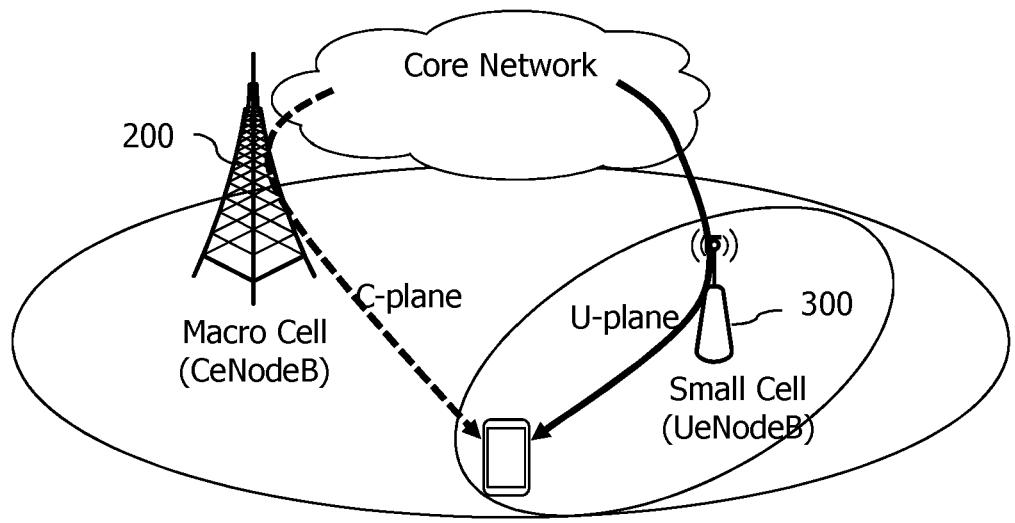
FIG. 12a and FIG. 12b show possible dual connectivity scenarios for a macro cell and a small cell.
Figure 12B:
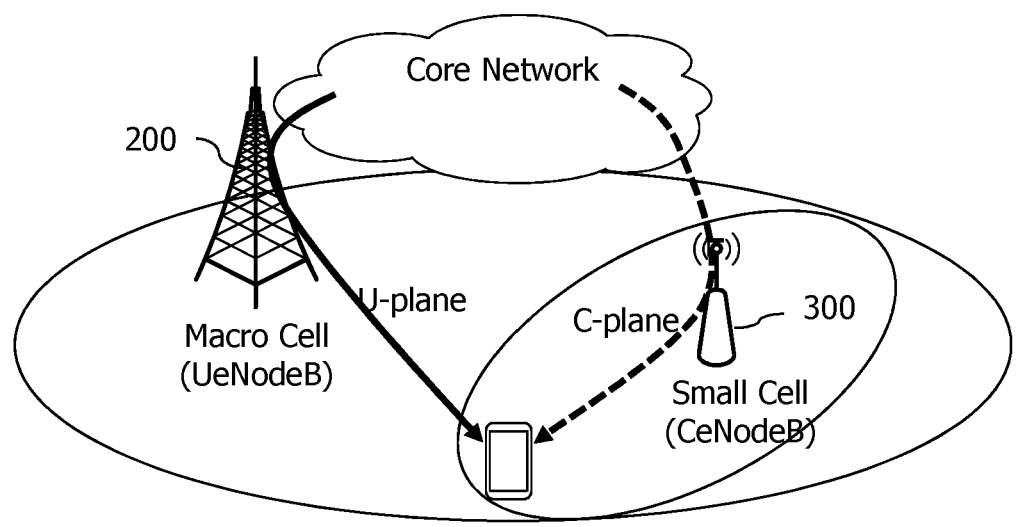

FIG. 12a and FIG. 12b show possible dual connectivity scenarios for a macro cell and a small cell.

As shown in FIG. 12a, a macro cell and a small cell may be assigned to a UE as a Control-plane (hereinafter, C-plane) and a User-plane (hereafter, U-plane), respectively.

Alternatively, as shown in FIG. 12b, a small cell and a macro cell may be assigned to a UE as a C-plane and a U-plane, respectively. In the present specification, for convenience, a cell of the C-plane and a cell of the U-plane are referred to as a C-cell and a U-cell, respectively.

The C-plane supports an RRC connection configuration and reconfiguration, an RRC idle mode, a mobility including handover, a cell selection/reselection, an HARQ process, a carrier aggregation (CA) configuration and reconfiguration, a necessary procedure for RRC configuration, a random access procedure, or the like. In addition, the U-plane supports data processing of an application, a CSI report, an HARQ process for application data, a multicasting/broadcasting service, or the like.

From a UE perspective, the C-plane and the U-plane are configured as follows. The C-cell may be configured as a primary cell, and the U-cell may be configured as a secondary cell. Alternatively, on the contrary, the U-cell may be configured as the primary cell, and the C-cell may be configured as the secondary cell. Alternatively, the C-cell may be separately handled in a special manner, and the U-cell may be configured as the primary cell. Alternatively, both of the C-plane and the U-cell may be configured as the primary cells. However, in the present specification, for convenience, it is assumed in the following description that the C-cell is configured as the primary cell and the U-cell is configured as the secondary cell.

Meanwhile, when a UE 100 frequently moves a short distance, handover of the UE may excessively frequently occur. To avoid frequent handovers, as illustrated in FIG. 12a, it is advantageous that the UE may be assigned the macro cell as a C-cell or primary cell and the small cell as a U-cell or secondary cell.

Thus, the macro cell may be always connected to the UE as the primary cell of the UE. In this case, since the macro cell is the primary cell, the UE may transmit a PUCCH to the macro cell.

Meanwhile, the small cell may be more densely disposed to process increasing data traffic over time, and a growing number of UEs may access the small cell with time. Accordingly, a larger number of UEs may be served than the number of UEs accommodated solely by the macro cell conventionally.

However, as the number of UEs accessing the small cell increases, the macro cell as the primary cell has an increasing amount of control information to process. That is, the macro cell has a growing burden of processing control information (for example, PUCCHs) on numerous UEs communicating with the small cell.

Further, even though the small cell is capable of transmitting downlink data to a plurality of UEs, if a PUCCH is transmitted only to the macro cell as the primary cell, PUCCH resources may be insufficient. A lack of PUCCH resources restricts the number of UEs to be allowed to access the macro cell. That is, a lack of PUCCH resources restricts the number of UEs to be allowed to be in an RRC connected state. Furthermore, if the PUCCH carries an HARQ_ACK of downlink data, a lack of PUCCH resources also restricts downlink data reception of the UE, which will be described below with reference to FIG. 13a and FIG. 13b.

Figure 13A:
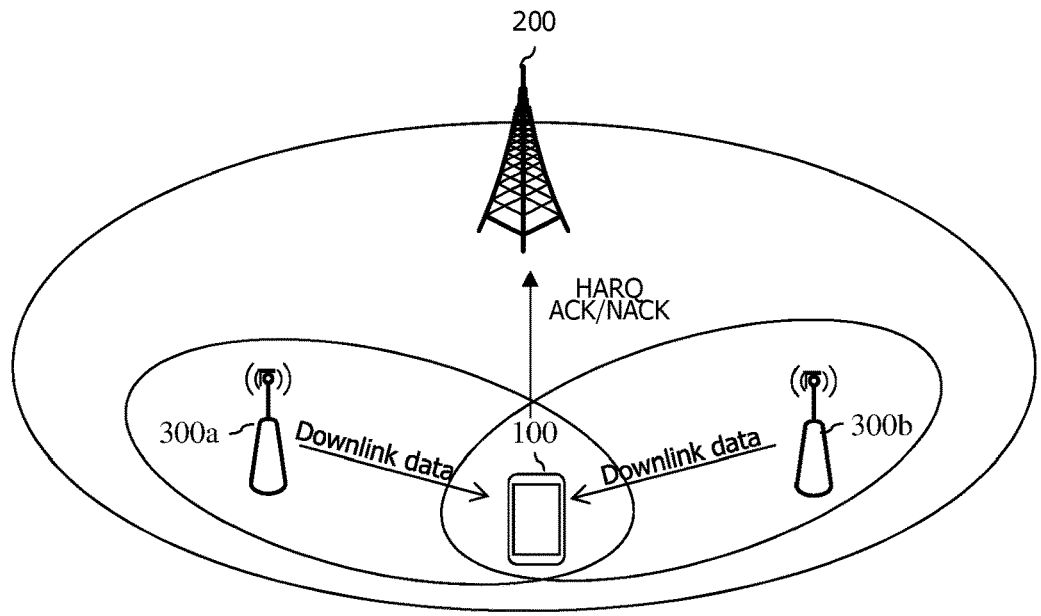
FIG. 13a and FIG. 13b illustrate a problem which may occur when a UE is dual-connected to a macro cell and a small cell.
Figure 13B:
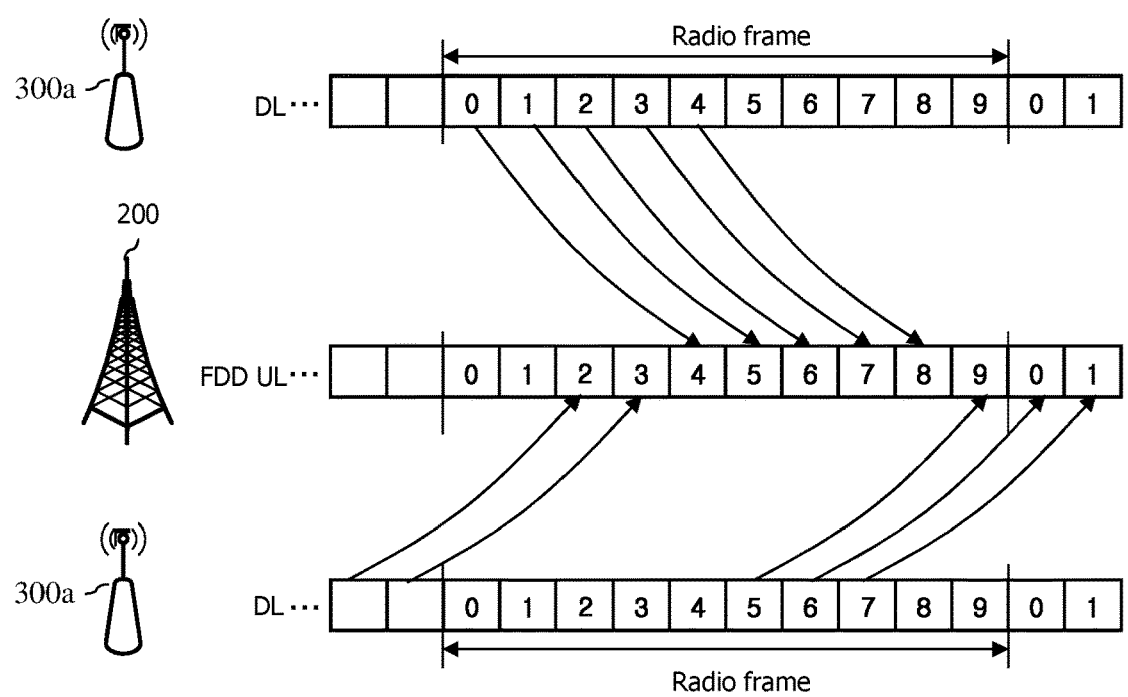

FIG. 13a and FIG. 13b illustrate a problem which may occur when a UE is dual-connected to a macro cell and a small cell.

As illustrated in FIG. 13a, a UE 100 is dual-connected to a macro cell 200 and first and second small cells 300a and 300b. Here, the macro cell 200 operates as a primary cell of the UE 100, and the first and second small cells 300a and 300b may operate as secondary cells.

When the UE 100 receives downlink data from each of the first and second small cells 300a and 300b, the UE 100 transmits a PUCCH including an HARQ ACK/NACK of the downlink data to the macro cell 200 as the primary cell.

Meanwhile, as illustrated in FIG. 13b, ACKs/NACKs of pieces of downlink data received on subframes 0, 1, 2, 3, and 4 of the first small cell 300a are transmitted on subframes 4, 5, 6, 7, and 8 of the macro cell 200. Likewise, ACKs/NACKs of pieces of downlink data received on subframes 5, 6, and 7 of the second small cell 300b are transmitted on subsequent subframes starting from subframe 9 of the macro cell 200.

As such, when the UE 100 receives downlink data from a plurality of small cells 300a and 300b, the UE 100 may need to transmit ACKs/NACKs on almost all subframes of an uplink carrier of the macro cell 200. Accordingly, uplink radio resources of the macro cell 200 are insufficient. Further, the macro cell has a burden of processing enormously increasing control information (that is, ACKs/NACKs). This problem is aggravated with an increasing number of UEs accessing the small cells.

This problem may be resolved by installing an additional base station corresponding to the macro cell or restricting the number of UEs to communicate with the small cells, which may be inefficient in view of installation costs and performance improvement.

<Brief Description of Disclosures of the Present Specification>

Thus, a disclosure of the present specification is aimed at increasing the number of UEs that a macro cell as a primary cell is capable of supporting. To achieve this purpose, one disclosure of the present specification suggests a method in which a UE aggregates HARQ ACK/NACKs of downlink data received from a plurality of secondary cells, that is, small cells, to transmit only on a particular subframe. That is, according to the method, even though the macro cell as the primary cell operates in FDD, the UE aggregates a plurality of HARQ ACKs to transmit only on a PUCCH of a particular subframe as in TDD, thereby saving PUCCH resources, which will be described in detail with reference to a drawing.

Figure 14:
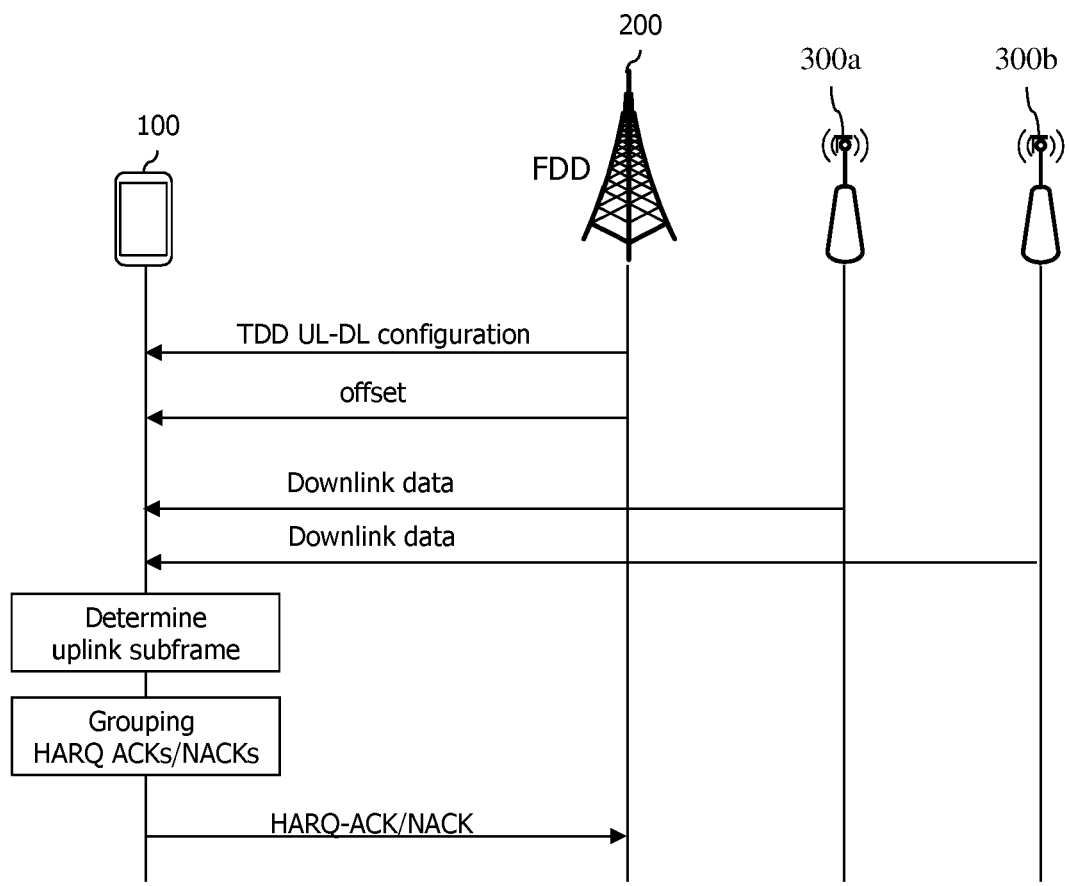
FIG. 14 illustrates a method according to one disclosure of the present specification.

FIG. 14 illustrates a method according to one disclosure of the present specification.

As illustrated in FIG. 14, a UE 100 is dual-connected to a macro cell 200 and first and second small cells 300a and 300b. Here, the macro cell 200 operates in FDD. Further, the macro cell 200 operates as a primary cell of the UE 100, and the first and second small cells 300a and 300b may operate as secondary cells.

First, the FDD-based macro cell 200 transmits a TDD UL-DL configuration to the UE 100. The TDD UL-DL configuration may be transmitted via system information, for example, an SIB. The FDD-based macro cell 200 transmits the TDD UL-DL configuration so that the UE 100 determines an HARQ ACK/NACK transmission timing according to the TDD UL-DL configuration. Here, the FDD-based macro cell 200 may transmit a higher-layer signal to the UE 100 to allow the UE 100 whether to determine the HARQ ACK/NACK transmission timing according to the TDD UL-DL configuration or according to FDD.

Meanwhile, the FDD-based macro cell 200 may transmit a time offset for the TDD UL-DL configuration to the UE 100. The time offset is UE-specific. Thus, the time offset may vary depending on a UE. The time offset may be transmitted to the UE through a higher-layer signal, for example, an RRC signal.

Meanwhile, when the UE 100 receives a plurality of pieces of downlink data from the first and second small cells 300a and 300b, the UE 100 determines a subframe to transmit a PUCCH (or PUSCH) including HARQ ACKs/NACKs of the pieces of downlink data according to the TDD UL-DL configuration and the offset.

When the particular frame is determined, the UE 100 aggregates the HARQ ACKs/NACKs of the pieces of downlink data and transmits the HARQ ACKs/NACKs to the FDD-based macro cell 200 through a PUCCH (or PUSCH) on the determined subframe.

This method is advantageous in that a plurality of HARQ ACKs/NACKs is transmitted on one subframe, while each UE uses a plurality of subframes to transmit a plurality of HARQ ACKs/NACKs in a conventional FDD mode. For example, to transmit an HARQ ACK/NACK to the FDD-based macro cell 200 according to the conventional mode, four HARQ ACKs/NACKs of four pieces of downlink data received on four downlink subframes may be transmitted on four uplink subframes. However, according to the present method, when the FDD-based macro cell 200 uses TDD UL-DL configuration 4 for an HARQ ACK/NACK transmission timing, four HARQ ACKs/NACKs of four pieces of downlink data received on four downlink subframes may be transmitted on one uplink subframe. This example is illustrated based on a transmission mode (TM) using a single transport block (TB).

Meanwhile, the time offset is used as mentioned above, because if following a conventional TDD UL-DL configuration, scheduling may be partly restricted depending on an assigned UL/DL subframe. Specifically, in TDD UL-DL configuration 4, only subframe 2 and subframe 3 are used as uplink subframes within the cell. Thus, when the FDD-based macro cell 200 follows merely the TDD UL-DL configuration, remaining uplink subframes are not used to decrease efficiency.

Thus, it is preferable that a UE-specific time offset is determined to be transmitted through a higher-layer signal or is designated in advance such that UEs in the macro cell 200 have different time offsets. When the time offset is designated in advance, the time offset may be determined based on a cell ID of a small cell that the UE is accessing, a cluster ID, or an RNTI value. Alternatively, the time offset may be transmitted to the UE through a random access response (RAR).

Figure 15:
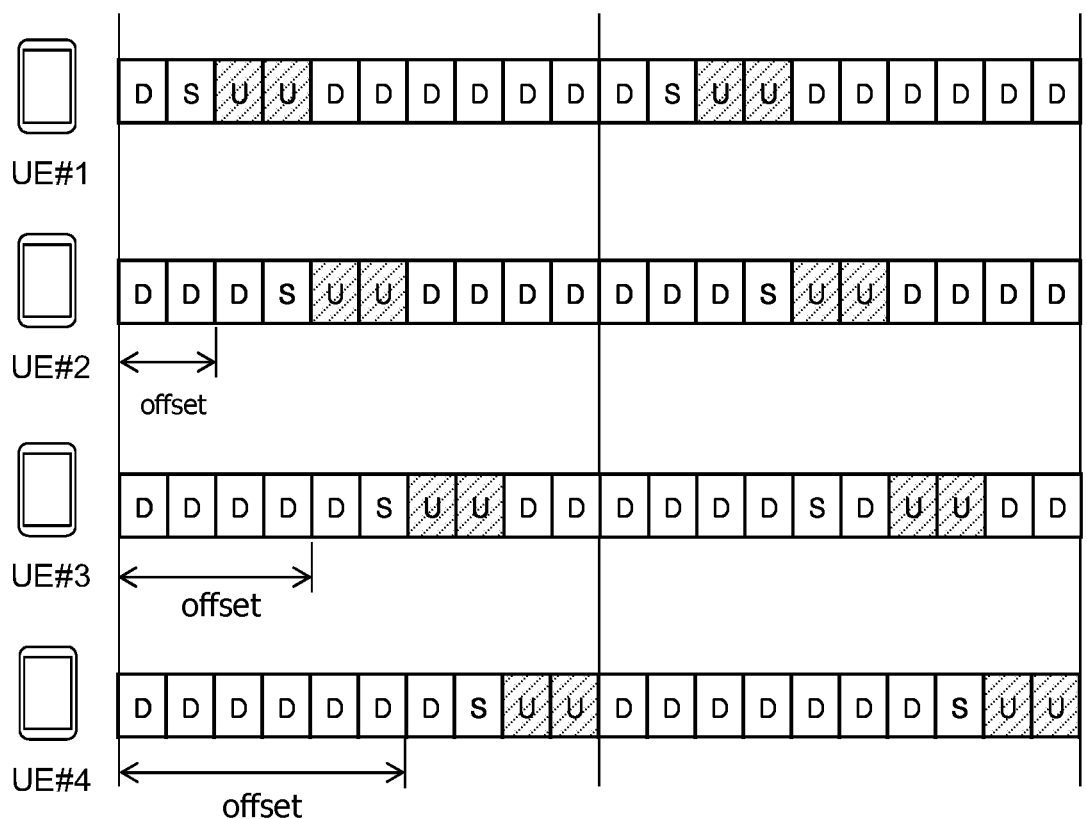
FIG. 15 shows an example of managing an FDD uplink subframe in a TDD mode according to one disclosure of the present specification.

FIG. 15 shows an example of managing an FDD uplink subframe in a TDD mode according to one disclosure of the present specification.

As illustrated in FIG. 15, an FDD-based macro cell 200 manages an uplink carrier according to a TDD UL-DL configuration and configures a different time offset for each UE or UE group, thereby efficiently using all subframes of the uplink carrier. Efficiently distributing all subframes of the uplink carrier by UEs of UE groups results in efficient distribution of PUCCH resources by UEs of UE groups.

Meanwhile, the FDD-based macro cell 200 may apply a different TDD UL-DL configuration to each UE or UE group. When the FDD-based macro cell 200 uses the TDD UL-DL configuration, the FDD-based macro cell 200 may transmit DAI and an uplink index, which is included in DCI, to the UE. When the FDD-based macro cell 200 uses the TDD UL-DL configuration, the FDD-based macro cell 200 may allow an increase in bits for an HARQ process.

Hereinafter, another disclosure of the present specification will be described.

According to the other disclosure of the present specification, PUCCH resources may be allocated in a divided manner for a UE receiving downlink data from a small cell (hereinafter, small-cell UE) and another UE. Specifically, RB locations for PUCCH transmission are partitioned for the small-cell UE and the other UE. Further, configuration information on a PUCCH is additionally allocated for the small-cell UE. The other disclosure is advantageous in that when a UE having low mobility receives a service from the small cell, a PUCCH transmitted by the UE to the macro cell may simultaneously have an RB region allocated for mobility support and an RB allocated for non-mobility support. For example, a delta value affecting the number of PUCCH resources distinguished by a cyclic shift (CS) may have a high value for supporting high mobility, in which case the number of PUCCH resources distinguished by the CS may be reduced. On the contrary, the RB for non-mobility support may have a delta value of 1, for example, in which case the number of PUCCH resources distinguished by the CS may be maximized.

Figure 16:
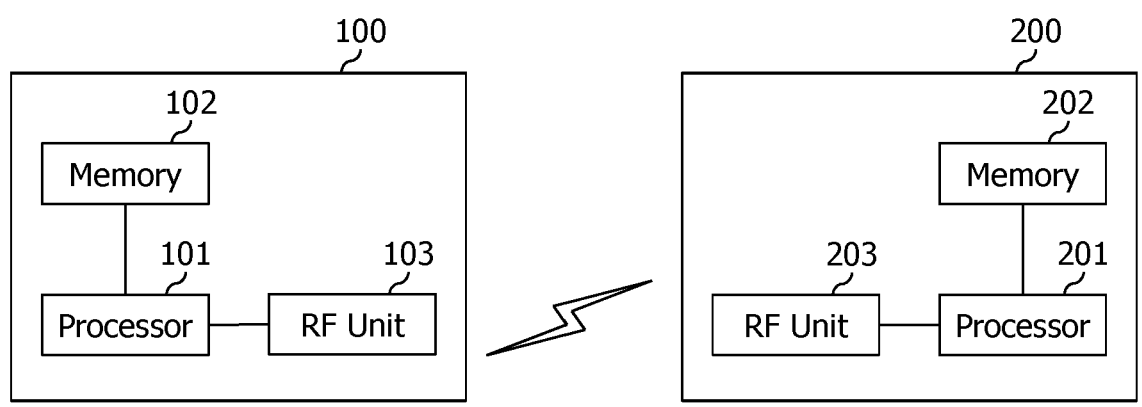
FIG. 16 is a block diagram of a wireless communication system according to a disclosure of the present specification.

The aforementioned embodiments of the present invention can be implemented through various means. For example, the embodiments of the present invention can be implemented in hardware, firmware, software, combination of them, etc. Details thereof will be described with reference to the drawing FIG. 16 is a block diagram of a wireless communication system according to a disclosure of the present specification.

A BS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

A UE 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a hybrid automatic repeat request (HARQ) acknowledgement (ACK)/non-acknowledgement (NACK), the method performed by a user equipment (UE) and comprising:
receiving a time division duplex (TDD) uplink (UL)-downlink (DL) configuration for a serving cell, which is a frequency division duplex (FDD) based cell;
receiving an HARQ subframe offset related to the TDD UL-DL configuration for the serving cell; and
transmitting the HARQ ACK/NACK on an uplink subframe of the serving cell,
wherein the uplink subframe of the serving cell is a FDD subframe,
wherein the uplink subframe of the serving cell is determined based on the HARQ subframe offset and the TDD UL-DL configuration for the serving cell, and
wherein an uplink signal is not transmitted to the serving cell on a subframe other than the uplink subframe of the serving cell determined based on the HARQ subframe offset and the TDD UL-DL configuration for the serving cell.

2. The method of claim 1, wherein the uplink subframe of the serving cell is determined by applying the HARQ subframe offset to a subframe designated as uplink based on the TDD UL-DL configuration for the serving cell.

3. The method of claim 1, wherein the HARQ subframe offset is received through a higher layer signal.

4. The method of claim 1, wherein the HARQ subframe offset is UE-specific.

5. The method of claim 1,
wherein the TDD UL-DL configuration and a second TDD UL-DL configuration received by a second UE from the same serving cell are the same configuration for the serving cell, and
wherein the HARQ subframe offset and a second HARQ subframe offset received by the second UE are different offsets.

6. A user equipment (UE) comprising:
a transceiver, and
a processor, operatively coupled to the transceiver, wherein the processor is configured to:
control the transceiver to receive a time division duplex (TDD) uplink (UL)-downlink (DL) configuration for a serving cell, which is a frequency division duplex (FDD) based cell;
control the transceiver to receive an HARQ subframe offset related to the TDD UL-DL configuration for the serving cell, which is the FDD based cell; and
control the transceiver to transmit the HARQ ACK/NACK on an uplink subframe of the serving cell, which is the FDD based cell,
wherein the uplink subframe of the serving cell is a FDD subframe, wherein the uplink subframe of the serving cell is determined based on the HARQ subframe offset and the TDD UL-DL configuration for the serving cell, and wherein an uplink signal is not transmitted to the serving cell, which is the FDD based cell, on a subframe other than the uplink subframe of the serving cell determined based on the HARQ subframe offset and the TDD UL-DL configuration for the serving cell.

7. The UE of claim 6, wherein the uplink subframe of the serving cell is determined by applying the HARQ subframe offset to a subframe designated as uplink based on the TDD UL-DL configuration for the serving cell.

8. The UE of claim 6, wherein the HARQ subframe offset is received through a higher layer signal.

9. The UE of claim 6, wherein the HARQ subframe offset is UE-specific.

10. The UE of claim 6, wherein the TDD UL-DL configuration and a second TDD UL-DL configuration received by a second UE from the same serving cell are the same configuration for the serving cell, and wherein the HARQ subframe offset and a second HARQ subframe offset received by the second UE are different offsets.

11. A method for receiving a hybrid automatic repeat request (HARQ) acknowledgement (ACK)/non-acknowledgement (NACK), the method performed by a serving cell and comprising:

transmitting, to a user equipment (UE), a time division duplex (TDD) uplink (UL)-downlink (DL) configuration, for the serving cell, which is configured as a frequency division duplex (FDD) based cell;

transmitting, to the UE, an HARQ subframe offset related to the TDD UL-DL configuration for the serving cell; and receiving, from the UE, the HARQ ACK/NACK on an uplink subframe determined based on the HARQ subframe offset and the TDD UL-DL configuration for the serving cell, wherein the uplink subframe is a FDD subframe, and wherein an uplink signal is not received, from the UE, on a subframe other than the uplink subframe determined based on the HARQ subframe offset and the TDD UL-DL configuration for the serving cell.

12. The method of claim 11, wherein the uplink subframe is determined by applying the HARQ subframe offset to a subframe designated as uplink based on the TDD UL-DL configuration for the serving cell.

13. The method of claim 11, wherein the HARQ subframe offset is transmitted through a higher layer signal.

14. The method of claim 11, wherein the HARQ subframe offset is UE-specific.

15. The method of claim 11, further comprising:

transmitting, to a second UE, a second TDD UL-DL configuration, wherein the TDD UL-DL configuration transmitted to the UE and the second TDD UL-DL configuration are the same configuration; and transmitting, to the second UE, a second HARQ subframe offset, wherein the HARQ subframe offset transmitted to the UE and the second HARQ subframe offset are different offsets.

16. A serving cell configured as a frequency division duplex (FDD) based cell, and configured to receive a hybrid automatic repeat request (HARQ) acknowledgement (ACK)/non-acknowledgement (NACK), the serving cell comprising:

a transceiver, and a processor, operatively coupled to the transceiver, wherein the processor is configured to:

control the transceiver to transmit, to a user equipment (UE), a time division duplex (TDD) uplink (UL)-downlink (DL) configuration, for the serving cell, which is configured as a frequency division duplex (FDD) based cell;

control the transceiver to transmit, to the UE, an HARQ subframe offset related to the TDD UL-DL configuration for the serving cell; and control the transceiver to receive, from the UE, the HARQ ACK/NACK on an uplink subframe determined based on the HARQ subframe offset and the TDD UL-DL configuration for the serving cell, wherein the uplink subframe is a FDD subframe, and wherein uplink signal is not received, from the UE, on subframe other than the uplink subframe determined based on the HARQ subframe offset and the TDD UL-DL configuration for the serving cell.

* * * * *